United States Patent
Krisko

(10) Patent No.: US 6,530,668 B2
(45) Date of Patent: Mar. 11, 2003

(54) HEAT-BENDABLE MIRRORS

(75) Inventor: Annette J. Krisko, Prairie de Sac, WI (US)

(73) Assignee: Cardinal CG Company, Eden Prairie, MN (US)

(*) Notice: Subject to any disclaimer, the term of this patent is extended or adjusted under 35 U.S.C. 154(b) by 0 days.

(21) Appl. No.: 09/747,095

(22) Filed: Dec. 22, 2000

(65) Prior Publication Data

US 2001/0021071 A1 Sep. 13, 2001

Related U.S. Application Data

(63) Continuation of application No. 08/963,599, filed on Oct. 31, 1997, now abandoned.

(51) Int. Cl.$^7$ ................................................. G02B 5/08
(52) U.S. Cl. ........................................ 359/883; 359/838
(58) Field of Search .......................... 359/883, 838, 359/584, 884, 585, 586; 427/167, 165

(56) References Cited

U.S. PATENT DOCUMENTS

| | | | |
|---|---|---|---|
| 3,770,335 A | 11/1973 | Colburn et al. | |
| 4,166,018 A | 8/1979 | Chapin | |
| 4,482,209 A | 11/1984 | Grewal et al. | |
| 4,547,432 A | 10/1985 | Pitts et al. | |
| 4,610,771 A | 9/1986 | Gillery | |
| 4,666,263 A | 5/1987 | Petcavich | |
| 4,826,525 A | * 5/1989 | Chesworth et al. | 65/60.2 |
| 4,847,157 A | 7/1989 | Goodman | |
| 4,898,790 A | 2/1990 | Finley | |
| 4,955,705 A | 9/1990 | Nakajima et al. | |
| 4,956,001 A | 9/1990 | Kitagawa et al. | |
| 4,963,012 A | 10/1990 | Tracy et al. | |

(List continued on next page.)

FOREIGN PATENT DOCUMENTS

| | | |
|---|---|---|
| EP | 0 176 935 | 4/1986 |
| EP | 0 456 488 | 11/1991 |
| EP | 0 546 470 | 6/1993 |
| EP | 0 761 618 | 3/1997 |
| GB | 2 224 366 | 5/1990 |
| GB | 2268509 | 1/1994 |
| JP | 1 279 201 | 11/1989 |
| JP | 3 191 301 | 8/1991 |
| JP | 4-86157 | 3/1992 |
| WO | WO 91/16197 | 10/1991 |
| WO | WO 97/01775 | 1/1997 |
| WO | WO 97/31872 | 9/1997 |

OTHER PUBLICATIONS

Vvedenskii et al; "Wide–band reflectors based on silver films"; Sov. J. Opt. Technol 50 (12) Dec. 1983, p. 781.

Golubenko et al; "Propagation of picosecond pulses through light guides"; Sov. J. Opt. Technol 50 (12), Dec. 1983, p. 782.

Primary Examiner—Cassandra Spyrou
Assistant Examiner—Euncha Cherry
(74) Attorney, Agent, or Firm—Fredrikson & Byron PA

(57) ABSTRACT

A heat-formable mirror comprising a flat substrate capable of plastic flow upon application of heat and a sputter-deposited coating formed on the surface of the substrate. From the substrate outwardly, the coating comprises a transparent amorphous layer and a reflective layer comprising contiguous first and second different metal films. The first metal film, positioned nearer the substrate than the second metal film, is a reflective metal film, and the second metal film comprises a protective film that is less reflective than the reflective metal film, the second metal film being of niobium, tungsten, tantalum, iron and nickel and being present in a thickness sufficient to protect the first metal film and avoid significant reduction of reflectance during heat forming of the mirror.

11 Claims, 1 Drawing Sheet

U.S. PATENT DOCUMENTS

| | | |
|---|---|---|
| 5,059,295 A | 10/1991 | Finley |
| 5,085,926 A | 2/1992 | Iida et al. |
| 5,112,693 A | 5/1992 | Gillery |
| 5,215,832 A | 6/1993 | Hughes et al. |
| 5,216,551 A * | 6/1993 | Fujii .......................... 359/584 |
| 5,267,081 A | 11/1993 | Dein |
| 5,270,517 A | 12/1993 | Finley |
| 5,296,302 A | 3/1994 | O'Shaughnessy et al. |
| 5,324,373 A | 6/1994 | Gillner et al. |
| 5,344,718 A | 9/1994 | Hartig et al. |
| 5,376,455 A | 12/1994 | Hartig et al. |
| 5,424,876 A * | 6/1995 | Fujii .......................... 359/884 |
| 5,505,989 A | 4/1996 | Jenkinson |
| 5,535,056 A * | 7/1996 | Caskey et al. ......... 204/192.26 |
| 4,780,372 A * | 10/1998 | Tracy et al. ................ 428/428 |

\* cited by examiner

HEAT-BENDABLE MIRRORS

This application is a continuation of U.S. application Ser. No. 08/963,599 filed on Oct. 31, 1997, which is abandoned.

FIELD OF THE INVENTION

The present invention relates to mirrors and particularly to mirrors that are formed utilizing flat substrates such as glass which subsequently are heat-bent into a desired curved configuration.

BACKGROUND OF THE INVENTION

Curved mirrors commonly are employed as rear-view mirrors for motor vehicles, as reflecting surfaces for telescopes and the like. They may be formed by first bending a sheet of glass into a desired curved configuration, and subsequently apply a reflecting coating to one side or the other of the substrate. For example, curved mirrors of the type used in carnivals to provide amusing, contorted reflections of a viewer may be made by first forming a sheet into the desired shape, and then coating one surface of the glass with metallic silver and a protective paint overcoat.

Mirrors also can be manufactured by applying a reflective coating to a glass substrate using a magnetron sputtering technique of the type described in Chapin, U.S. Pat. No. 4,166,018. Chromium or silver may be employed as the reflective layer. When curved mirrors are manufactured using a magnetron sputtering process, the glass substrates for the mirrors are first bent as desired typically in a size that would produce two or more mirrors. After the bent glass pieces are washed, they are placed on an appropriate carrier and are coated by magnetron sputtering. Due to curvature of the substrates, the reflective coatings that are produced have not been precisely uniform. The manufacturing process itself is tedious and time-consuming inasmuch as it requires multiple small glass substrates to be laid by hand upon a carrier that passes through a magnetron sputtering apparatus, and requires each of the resulting individual mirror pieces to be removed by hand by the carrier sheet once the sputtering operation is complete.

To avoid these problems, it would be desirable to first sputter deposit a reflective coating on a flat glass sheet to form a mirror, and then heat-bend and cut the mirror as desired. U.S. Pat. No. 4,826,525 (Chesworth et al.) shows an example for the preparation of a mirror through the use of consecutive chromium and aluminum coatings on glass. In general, when flat glass sheets are coated with a reflecting layer using chromium, for example, as the reflective metal, and then are heat bent at the softening temperature of glass, the coatings may develop defects which may be referred to as pits. The pits appear as visually detectable, small, circular defects having little reflectance. The phenomena of pitting (sometimes referred to as "pinholing") is not fully understood, but it is believed to be a function of stresses developed during the bending operation in one or more of the reflective sputter deposit films forming the reflective layer.

SUMMARY OF THE INVENTION

The present invention relates to a heat-formable mirror that is capable of being configured at elevated temperatures into a curved mirror without the occurrence of pitting and without significant changes in reflectance. The heat-formable mirror comprises a substrate, preferably glass, bearing, from the surface of the substrate outwardly, a transparent amorphous layer and a reflective layer. The latter comprises first and second contiguous but different metal films. The first metal film is a reflective film that is positioned nearer the substrate than the second metal film, and the second metal film comprises a protective film that is less reflective than the first metal film. The second metal film may be of niobium, tungsten, tantalum, iron or nickel, niobium being greatly preferred. The reflective metal film, which is preferably aluminum, is of sufficient thickness as to provide the mirror with a reflectivity of at least 50%, and the second metal film is present in a thickness sufficient to protect the first metal film and to avoid significant reduction of reflectivity during heat forming of the mirror. The product as thus described may also have a protective film positioned further from the substrate than the reflective layer, the protective film preferably comprising a dielectric oxide or nitride such as sputterdeposited silicon nitride, sputter deposited aluminum oxide or sputter deposited silicon oxide. Of these, silicon nitride is preferred.

When a heat-formable mirror of the invention is heat formed at a temperature above the temperature at which layers of the reflective coating are deposited, atomic diffusion and/or structural rearrangements can occur between the various sputtered films, changing the reflective properties of the bent mirror product. The heat-formable mirrors of the invention, however, largely and preferably fully retain their important optical mirror properties (low transmissivity, high reflectance) when subjected to heating and bending in this manner, and moreover are free from the pitting phenomenon.

In another embodiment, the invention provides a curved mirror that is produced by providing a heat-formable mirror of the type described above, and subjecting the mirror to bending forces at a temperature at which the substrate is capable of plastic deformation (e.g., the glass transition temperature in the case of glass substrates). The flat mirror is bent at that temperature into a desired curved configuration to produce the curved mirror, the latter being cooled while maintaining its curved configuration. The resulting curved mirror desirably retains at least about 100% of the reflectance and not over about 150% of the transmissivity of the heat-formable flat mirror from which it was made, and is essentially free from observable pitting.

Curved mirrors of the invention desirably display a hemispherical reflectance (as measured using a reflectometer and integrating sphere over the wavelength range of 200 to 2600 nm) of at least 50% and a transmissivity not greater than about 4.0%. "Reflectance" herein is measured using a reflectometer utilizing a tungsten lamp at a filament temperature of 2854° K. at an angle of incidence of 25°+5° utilizing a detector cell approximately duplicating the human eye (CIE standard photopic curve) and an integrating sphere. In addition to exhibiting good optical properties for a mirror product, the film stack should be physically and chemically durable in both the flat and bent states.

DETAILED DESCRIPTION OF THE PREFERRED EMBODIMENTS

Figure 1:
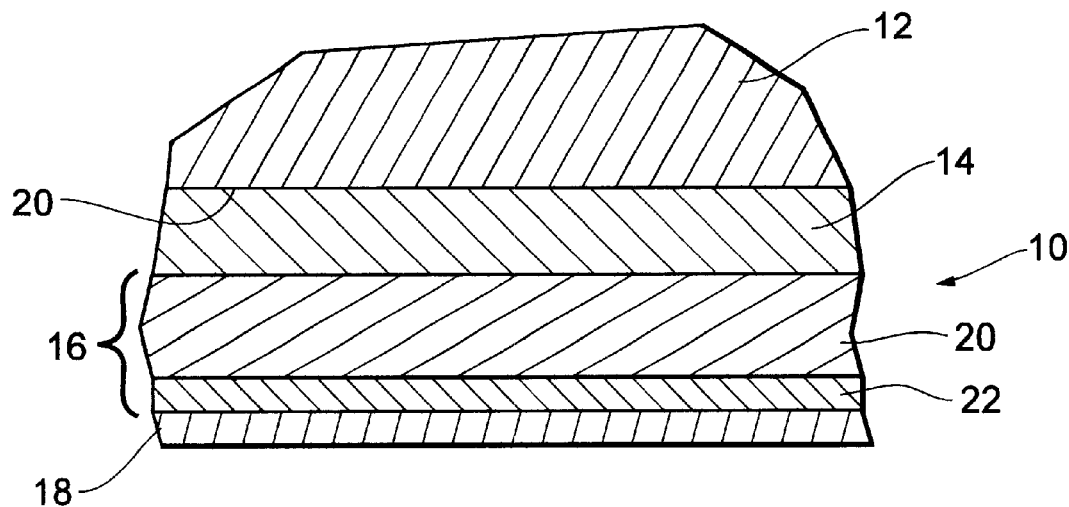
FIG. 1 is a broken away, cross-sectional schematic view of a heat-formable mirror of the invention.

Referring to FIG. 1, a heat-formable mirror (10) of the invention is shown in which the flat, sheet-like substrate is glass. Sputter deposited on the flat surface (20) of the substrate in sequence is an amorphous layer (14), a reflective layer (16) comprising first and second metal films (20), (22), and a protective layer (18).

In the embodiment of FIG. 1, the amorphous layer (14) is sputter-coated directly upon the flat surface (20) of the glass substrate, using well-known magnetron sputtering techniques of the type described in Chapin, U.S. Pat. No. 4,166,018. "Sputter deposition", "sputter deposited", and words of similar import are used herein to refer to coatings of the type produced by magnetron sputtering.

The film (14) is amorphous, that is, it does not display an observable crystal habit or, crystal ordering when viewed utilizing cross sectional transmission electron microscopy ("XTEM"). In general, it is has been found that the formation of pin holes or pitting can be deterred through the use of this amorphous layer between the glass substrate and the overlying reflective layer. The amorphous layer is a dielectric material, preferably an oxide or a nitride, examples of which are silicon nitride, titanium nitride and tin oxide. Of these, silicon nitride is preferred. The amorphous layer desirably is employed at a thickness of at least 200 Å, preferably at least 300 Å, and preferably in the range of 300–400 Å. The sufficient thickness of the amorphous material is employed so as to avoid pitting.

Referring again to FIG. 1, the reflective layer (16) is, as mentioned above, comprised of two contiguous metal films (20) and (22), the film (20) being a reflective metal film of sufficient thickness to provide the resulting mirror with a reflectance (hemispherical reflectance, as measured using a reflectometer and integrating sphere over the wave length range of 200 to 2600 nm) of at least 50% and a transmissivity not greater than about 4%, and the metal film (22) serving to protect the reflective metal film (20). The reflective metal film desirably is selected from the group consisting of aluminum, titanium, zirconium, molybdenum, copper, hafnium, gold and stainless steel, and combinations thereof. Aluminum is the preferred reflective metal. Desirably avoided as the reflective metal film are chromium, chromium nickel alloys and silver, inasmuch as these reflective materials appear to promote pitting or pinholing. It is believed that small amounts of these materials, however, may be employed in combination with aluminum or other reflective metals such as those listed above.

The protective metal coating (22) is formed of a metal different from the metal used for the reflective layer (20). The protective metal film (22) is less reflective than the reflective layer (20), and, preferably, We metal that is employed for the film (22) is less reflective than the metal employed for the reflective metal film (20) when metal films of equal thicknesses are compared. The film (22) preferably is formed of a metal selected from the group consisting of niobim, tungsten, tantalum, iron and nickel or combinations thereof. Niobium is the preferred metal for the protective layer (22).

Protective metal film (22) is utilized at a thickness providing good protection against oxidation of the aluminum or other reflective metal film beneath it, but the thickness to this film should not be so great as to significantly reduce reflectance after bending. Within these parameters, the thickness of the metal film (22) may be varied as desired and offers some control over the reflected color of the mirror. Niobium, as mentioned, is the preferred metal film and desirably is used in a thickness ranging from about 50 Å to about 400 Å, with 100–150 Å being the preferred range.

In the preferred embodiment, the reflective metal film (20) is aluminum and the protective metal film (22) is niobium, the aluminum being present at a thickness in the range of about 200 to about 1000, preferably about 530 Å, and the niobium being present at a thickness in the range of about 50–400 Å and preferably 100–150 Å. These metal films are contiguous; that is, they are formed one upon the other.

An optional protective layer is shown in FIG. 1 as (18), and this layer desirably is sputtered deposited over and preferably directly upon the reflective layer (16), that is, directly upon the surface of the protective metal layer (22). The outer protective layer (18) additionally provides some control over the reflected color of the mirror, and serves, with the protective metal film (22), to prevent oxygen from reaching the reflective metal film (20). Silicon nitride and zinc oxide are suitable materials for the protective layer (18), with silicon nitride being preferred, and the protective layer (18) may have a thickness in the range of about 50 to about 200 Å.

In a most preferred embodiment, the coating upon the glass substrate comprises the amorphous film (14), the reflective metal film (20) and the protective metal film (22) as being formed upon one another, that is, as contiguous coatings. The optional protective layer (18), when employed, desirably but not necessarily is formed upon the outer surface of the protective metal film (22). Moreover, it is desired that the amorphous layer (14) be formed directly upon the surface (20) of the glass substrate.

It will be understood that other and flither layers of sputtered materials may be positioned between or on either side of the amorphous layer (14), the reflective layer (16), or the protective layer (18), provided such additional layers do not contribute to objectionable pitting, discoloration or other failure of the coating when the mirror is subjected to heat forming processes. For example, stainless steel may be applied on either side of the amorphous layer (14); when applied over the amorphous layer, the stainless steel acts to improve reflectivity of the reflective metal film (20).

Figure 2:
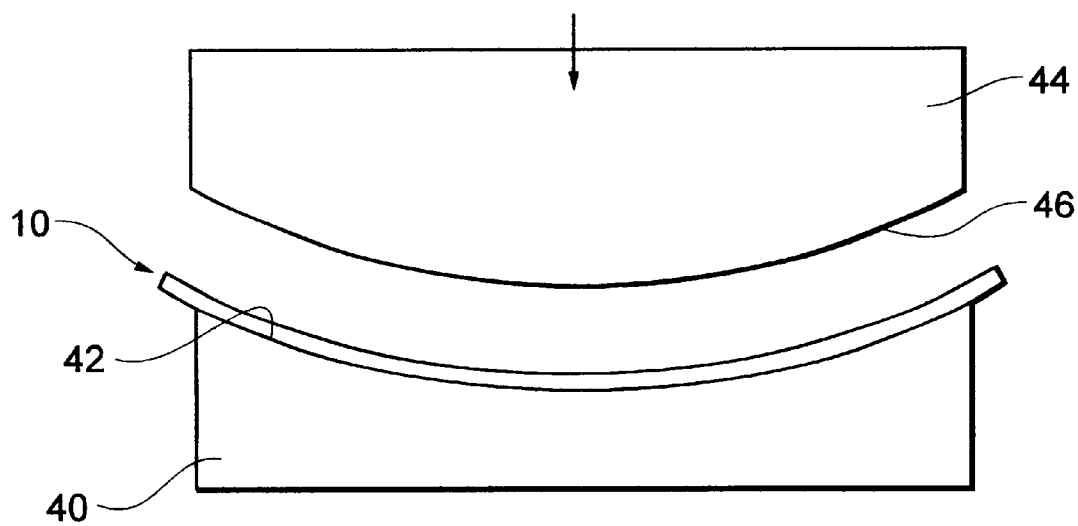
FIG. 2 is a schematic view showing the use of a heat-bending apparatus.

FIG. 2 schematically depicts a heated mold useful in the heat formation of curved glass sheets. Molds of this type are commonly used in the formation of, for example, curved automobile windshields and curved glass sheets that are subsequently to be provided with a mirrored surface for use as motor vehicle rear view mirrors and the like. The mold consists of a female portion (40) having a concave upper surface (42), and male portion (44) having a downwardly facing convex surface (46). In use, the mold portions are heated to the softening temperature of glass, and a heat-bendable mirror such as that described in connection with FIG. 1 is placed upon the surface of the female member with its sputtered-on coating facing downwardly. As the flat glass sheet is heated to its softening point, it sags downwardly into conformation with the upper surface (42) of the mold. The male mold portion is then urged downwardly against the other surface of the glass sheet and serves to ensure smooth conformation of the glass sheet against the surface (42). Once bending has been completed, the mold portions are cooled below the softening point of the glass substrate, are separated, and the bent mirror is removed. Operating temperatures for molds of this type commonly are in the range of 1110–1130° F.

The reflective coatings of mirrors of the invention, before and after bending, should demonstrate substantial durability. That is, the coatings should exhibit resistance to abrasion, to heat and cold extremes, to humidity, and to solvents such as alcohols and salt spray. Resistance to abrasion may be measured by sliding an ordinary pencil eraser (Blaisdell® #536T or equivalent), weighted with a 1 kg load, back and forth over a methanol-cleaned coated surface for 100 cycles. Coatings with acceptable durability should not display significant film loss or loss of reflectivity. Adherence of the sputtered-on film stack to the substrate can be tested by attempting to pull off the coating with a pressure-sensitive adhesive tape, as described in MIL-C-48497A. Resistance to alcohol may be tested by rubbing an area on the coating with an isopropanol-soaked clean cloth under hand pressure. A salt spray test is described in ASTM B-117, and is continued for 240 hours. To test for resistance to humidity, a coated specimen is exposed for 500 hours in a humidity chamber maintained at 45° C. and 98%–100% relative humidity. After each of the tests described above, the tested coatings are visually examined to detect any defects.

The invention may be more readily understood by reference to the following non-limiting example.

Using a commercial magnetron sputtering line manufactured by Airco, Inc., the upper cleaned surfaces of flat glass sheets were exposed to sputtering from various targets in a series of successive zones, the speed of travel of the glass sheets and the electric power delivered to the various magnetron sputtering units being such as to provide the desired thicknesses of the sputtered films. Initially, silicon from a silicon target was sputtered in a nitrogen-containing atmosphere to cause deposition of silicon nitride to a thickness of approximately 400 Å. Next, aluminum from an aluminum target and niobium from a niobium target was sputtered in an argon atmosphere to thicknesses of approximately 530 Å and 110 Å, respectively. Finally, silicon was sputtered from a silicon target in a nitrogen-containing atmosphere to provide a final layer of silicon nitride approximately 100 Å in thickness.

The resulting heat formable mirror was measured for transmission, reflectance and color properties and was then subjected to the bending procedure described above at a temperature of approximately 1130° F. Upon removal of the resulting curved mirror from the mold, the mirror was examined for coating defects and was also subjected to reflectance, transmissivity, and color measurements. No haze, pitting or other physical defect was observed. Reflectance before and after bending was 59%. Transmissivity increased from 2.2% to 2.6% upon bending, and the initial and final color coordinates of the bent film (Hunter L,a,b System Illuminant D 65) were L=73.3, a=0.65 and b=3.4. The bent mirror was subjected to the salt spray, humidity, abrasion, adherence and alcohol rub tests described above, with no noticeable defects appearing.

While a preferred embodiment of the present invention has been described, it should be understood that various changes, adaptations and modifications may be made therein without departing from the spirit of the invention and the scope of the appended claims.

What is claimed is:

1. A heat formable mirror comprising a flat substrate capable of plastic deformation upon application of heat, and a sputter-deposited coating formed on a surface of the substrate, the coating comprising, from the substrate outwardly, a transparent amorphous layer and a reflective layer comprising contiguous first and second different metal films, the first metal film being a reflective metal film positioned nearer the substrate than the second metal film, and the second metal film comprising a protective film less reflective than the reflective metal film and selected from the group consisting of niobium, tungsten, tantalum, iron and nickel, the reflective metal film being of a thickness providing said mirror with a reflectivity of at least 50% and said second metal film being present in a thickness sufficient to protect said first metal film and to avoid significant reduction of reflectance during heat forming of said mirror.

2. The heat formable mirror of claim 1 including a durable protective layer positioned further from the substrate than the second metal film.

3. The heat formable mirror of claim 2 wherein the durable protective layer comprises silicon nitride, aluminum oxide or silicon oxide.

4. The heat formable mirror of claim 1 wherein said first and second metal films comprise aluminum and niobium, respectively.

5. The heat formable mirror of claim 1 wherein said amorphous layer comprises an oxide or a nitride having a thickness range of from 250 to 400 Å.

6. The heat formable mirror of claim 5 wherein said amorphous layer comprises silicon nitride, titanium nitride or tin oxide.

7. The heat formable mirror of any one of claims 1 through 6 wherein said substrate is glass and wherein said amorphous layer is silicon nitride.

8. A heat formable mirror comprising a flat glass substrate and a sputter-deposited coating formed on a surface of the substrate, the heat formable mirror being formable at elevated temperatures without significant damage to the coating, the coating comprising, from the substrate outwardly:

a. an amorphous dielectric film comprising silicon nitride at a thickness ranging from 250 Å to 400 Å;

b. a reflective layer comprising contiguous first and second different metal films, the first metal film being selected from the group consisting of aluminum, titanium, zirconium, molybdenum, copper, hafnium, stainless steel and gold and combinations thereof, and positioned nearer the substrate than the second metal film, and the second metal film comprising niobium at a thickness in the range of 50 Å to 400 Å.

9. The heat formable mirror of claim 8 including a durable protective layer of silicon nitride positioned further from the substrate than the niobium film and providing oxygen permeation inhibition as to prevent the reflectance of the heat formable mirror from decreasing upon heat bending to less than 50%.

10. A heat formable mirror comprising a flat glass substrate and a sputter-deposited coating formed on a surface of the substrate, the coating comprising, from the substrate outwardly, a transparent amorphous layer and a reflective layer comprising contiguous aluminum and niobium films with the aluminum film being positioned nearer the sub rate than the niobium film, said aluminum film being of a thickness providing said mirror with a reflectivity of at least 50% and said niobium film ranging in thickness from 50 Å to 400 Å.

11. The heat formable mirror of claim 10 wherein said amorphous layer comprises silicon nitride at a thickness of from 250 Å to 400 Å.

* * * * *